United States Patent
De Maina

(10) Patent No.: US 8,727,445 B2
(45) Date of Patent: May 20, 2014

(54) VEHICLE SEAT

(75) Inventor: Cosimo De Maina, Alpignano (IT)

(73) Assignee: Petra Italia S.A.S. di Marina Bordo & C., Turin (IT)

( * ) Notice: Subject to any disclaimer, the term of this patent is extended or adjusted under 35 U.S.C. 154(b) by 445 days.

(21) Appl. No.: 13/052,751

(22) Filed: Mar. 21, 2011

(65) Prior Publication Data

US 2011/0254342 A1 Oct. 20, 2011

(30) Foreign Application Priority Data

Mar. 19, 2010 (EP) .................................... 10425083

(51) Int. Cl.
*A47C 7/02* (2006.01)
*A47C 7/00* (2006.01)

(52) U.S. Cl.
USPC .............. 297/452.56; 297/440.11; 297/440.2; 297/440.22; 297/452.55

(58) Field of Classification Search
USPC ............... 297/440.11, 440.2, 440.22, 452.55, 297/452.56
See application file for complete search history.

(56) References Cited

U.S. PATENT DOCUMENTS

| | | | | |
|---|---|---|---|---|
| 390,909 A * | 10/1888 | Seip | | 297/250.1 |
| 2,186,301 A * | 1/1940 | La More | | 297/440.21 |
| 2,960,152 A * | 11/1960 | Wendel | | 297/440.2 |
| 3,697,129 A * | 10/1972 | Sklaar | | 297/452.1 |
| 3,848,925 A * | 11/1974 | Harder, Jr. | | 297/452.14 |
| 5,655,816 A | 8/1997 | Magnuson et al. | | |
| 5,911,478 A * | 6/1999 | Goodman | | 297/440.11 |
| 6,099,073 A * | 8/2000 | Bruschi | | 297/59 |
| 6,511,562 B1 | 1/2003 | Coffield | | |
| 6,560,827 B1 * | 5/2003 | Gross | | 24/265 C |
| 6,612,654 B2 * | 9/2003 | Laws et al. | | 297/440.11 |
| 6,739,671 B2 * | 5/2004 | De Maina | | 297/440.1 |
| 6,779,849 B1 * | 8/2004 | Harper et al. | | 297/452.13 |
| 6,942,299 B1 * | 9/2005 | Sardo | | 297/452.55 |
| 7,125,081 B2 * | 10/2006 | Church et al. | | 297/440.11 |
| 7,278,691 B2 * | 10/2007 | Xiang | | 297/440.2 |
| 7,526,821 B2 * | 5/2009 | Chen et al. | | 5/98.1 |
| 7,568,768 B1 * | 8/2009 | Tsai | | 297/452.63 |
| 2009/0146467 A1 * | 6/2009 | Waite et al. | | 297/55 |

FOREIGN PATENT DOCUMENTS

EP 1 332 914 A1 8/2003

\* cited by examiner

*Primary Examiner* — David R Dunn
*Assistant Examiner* — Tania Abraham
(74) *Attorney, Agent, or Firm* — Dickstein Shapiro LLP

(57) ABSTRACT

A vehicle seat comprising a supporting structure and a first and a second contoured panel fitted to the supporting structure and respectively defining the seat portion and the backrest of the seat. The supporting structure comprises a first and a second lateral supporting member extending along opposite sides of the seat and joined to one another by a cross-member extending along the join between the seat portion and the backrest. The first and the second panel are covered with respective flexible cover sheets that are fixed securely to the supporting structure.

8 Claims, 4 Drawing Sheets

VEHICLE SEAT

The present invention relates to a vehicle seat.

In particular, the object of the present invention is to provide a vehicle seat that comprises a limited number of parts and which can be produced quickly and cheaply, even by unskilled workers.

BACKGROUND OF THE INVENTION

For example, European patent EP-B-1,332,914 filed by this same applicant describes a vehicle seat comprising a supporting structure and a first and a second contoured panel fitted to the supporting structure and respectively defining the seat portion and the backrest of the seat. The supporting structure comprises a first and a second lateral supporting member (generally made of metal, for example aluminium) extending along opposite sides of the seat and joined to one another by a cross-member extending along the join between the seat portion and the backrest. Each lateral supporting member comprises a first straight portion and a second straight portion longer than the first portion and joined to the first portion by an integral curved connecting portion.

According to European patent EP-B-1,332,914 each first straight portion has a respective first groove extending substantially along the whole of its length and each second straight portion has a respective second groove extending substantially along the whole of its length;
the first grooves are arranged so as to face one another and to house respective opposite lateral edges of the first panel to form the seat portion while the second grooves are arranged so as to face one another and house respective opposite lateral edges of the second panel to form the backrest.

A simple and robust seat that can be assembled and removed quickly is thus produced. In particular, the seat according to patent EP-B-1,332,914 allows the seat portion and/or the backrest to be replaced quickly in the event of damage by vandals.

SUMMARY OF THE INVENTION

The object of the present invention is to improve the seat according to patent EP-B-1,332,914 in order to produce a version in which the seat portion and/or the backrest are covered with a layer of covering material that is fixed securely to the seat structure and cannot be removed by vandals.

BRIEF DESCRIPTION OF THE DRAWINGS

The invention will now be described with particular reference to the accompanying drawings of a preferred non-limiting embodiment thereof in which.

DETAILED DESCRIPTION OF THE INVENTION

Figure 1:
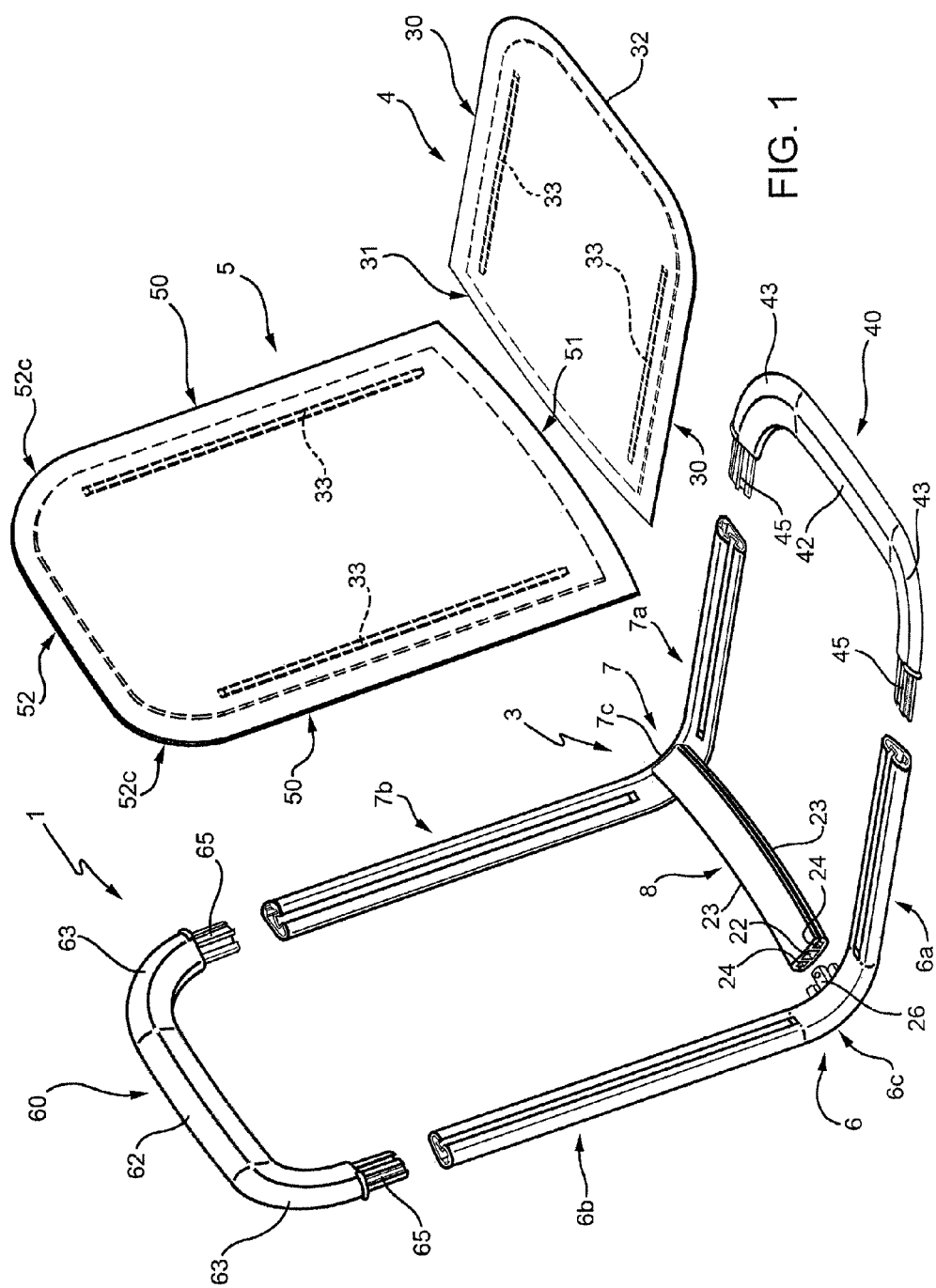
FIG. 1 is an exploded perspective view of a vehicle seat produced according to the present invention.

In FIG. 1 designated as a whole by number 1 is a vehicle seat.

The vehicle seat 1 comprises a supporting structure and a pair of contoured panels 4,5 fitted to the supporting structure 3 and respectively defining the seat portion and the backrest of the seat 1.

Figure 2:
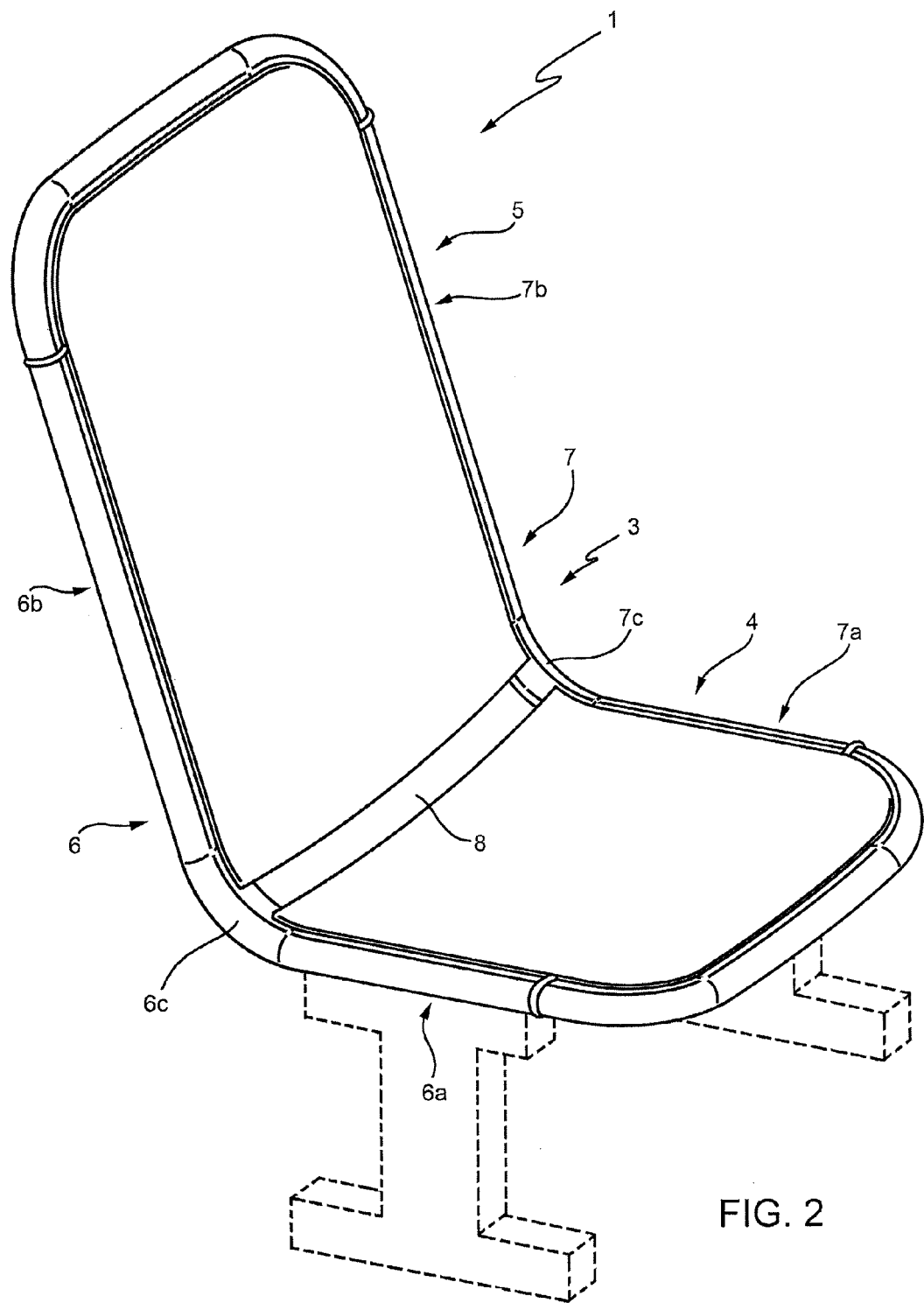
FIG. 2 is a perspective view of a vehicle seat produced according to the present invention.

The supporting structure 3 comprises a first and a second lateral supporting member 6,7 extending along opposite sides of the seat 1 and joined to one another by a cross-member 8 extending along the join between the seat portion and the backrest (in that respect also see FIG. 2).

More specifically, each lateral supporting member 6,7 comprises a first straight portion 6a,7a and a second straight portion 6b,7b longer than the first portion 6a,7a and joined to the latter by an integral C-shaped connecting portion 6c,7c.

Each lateral supporting member 6,7 is preferably defined by a tubular metal section (for example made of extruded aluminium).

Figure 3:
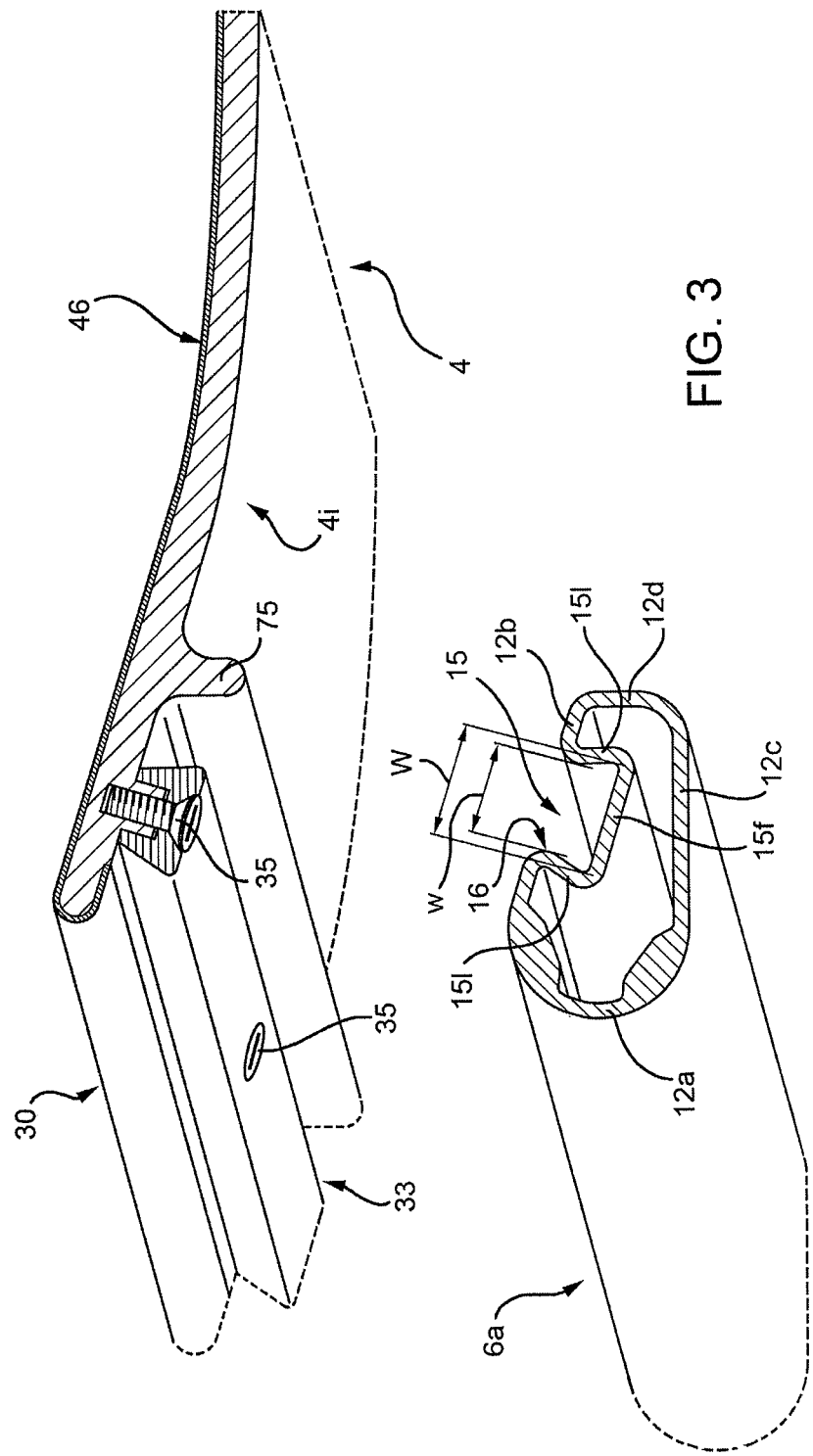
FIGS. 3 and 4 are perspective views of details of the seat according to the present invention.
Figure 4:
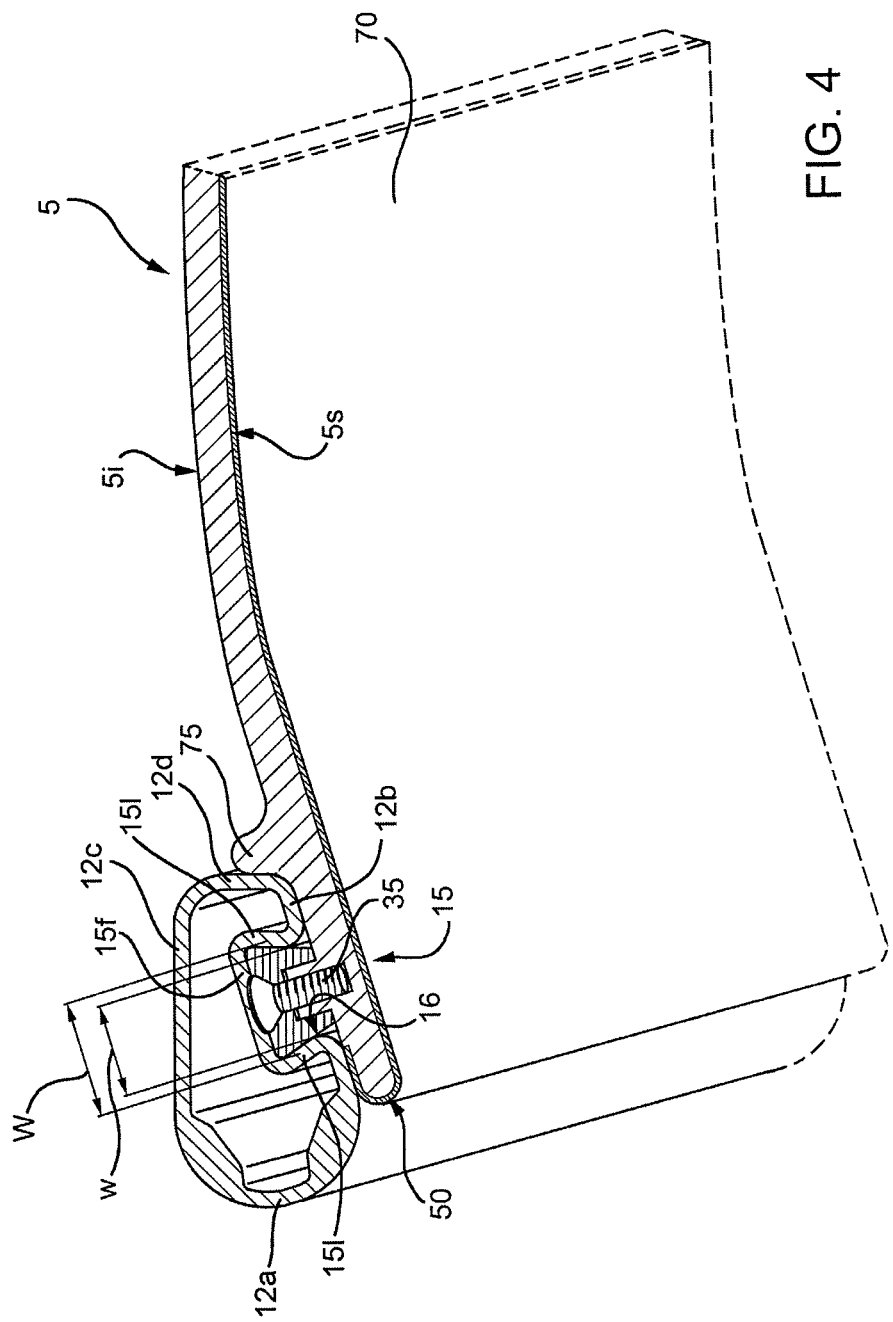

More specifically (FIGS. 3 and 4), the metal section comprises a first C-shaped side wall 12a integral with two substantially flat walls 12b,12c which face one another and are arranged at a slope with respect to one another so as to merge with a second substantially C-shaped side wall 12d. The second C-shaped side wall has a smaller curvature radius than the first side wall 12a.

Each lateral supporting member 6,7 defines an elongated groove 15 in correspondence with the flat wall 12b of the tubular section, extending at least for the whole of the first straight portion 6a,7a and the second straight portion 6b,7b.

The groove 15 communicates with the outside of the elongated member through a rectangular aperture 16 the width w of which (measured between the facing portions of the section delimiting said aperture 16) is less than the maximum width W (measured along a direction parallel to w) of the cross-section of the groove 15. For instance, the groove in the example of the invention has an isosceles trapezoidal cross-section (also known as a "swallow-tail" cross-section) in which the width w is given by the shortest side of the trapezium and the width W is given by the longest side of the trapezium.

In more detail, the groove 15 is delimited by a flat rectangular base wall 15f integrally joined to the wall 12b by two side walls 151.

Each first straight portion 6a,7a is thus provided with a groove 15 and each second straight portion 6b,7b is also provided with a groove 15.

The cross-member 8 preferably consists of a metal section (for example made of aluminium) comprising a tubular square-section central portion 22 (FIG. 1) and two pairs of walls 23 extending integrally from opposite faces of the central portion 22 to define respective grooves 24. There are thus two grooves 24 extending along opposite sides of the cross-member 8.

In a fitted position, opposite end portions of the tubular square-section central portion 22 house respective appendices 26 which extend from the connecting portion 6c,7c. The appendices 26 are fixed securely to the cross-member 8 by means of screws (not illustrated). In this fitted position the appendices are arranged between the walls 23 so as to engage end portions of the grooves 24.

In its simplest form shown in FIGS. 1 and 2 the contoured panel 4 is roughly rectangular, of constant thickness, and bounded (FIG. 1) by two straight lateral edges 30, by a substantially straight rear edge 31, and by a front edge 32 joined to the lateral edges 30 by two curved portions 32c.

A pair of appendices 33 extend from a first underside 4i (FIG. 3) of the contoured panel 4; each appendix 33 has a cross-section complementary to that of the groove 15 inside which it is housed. For example in the example that is illustrated each appendix 33 has an isosceles trapezoid cross-section (also known as a "swallow-tail" cross-section) in which the shortest side portion is fixed securely to the underside of the panel 4 and the longest side portion faces the bottom wall 15f of the groove 15.

The appendices 33 can be made of a plastic material and joined to the panel 4 by means of screws 35. Alternatively, the appendixes 33 can be integral with the panel 4, The appendices 33 thus engage the grooves 15 of the first straight portion 6a,7a, the rear edge 31 is housed in the groove 24 and the front edge 32 rests on a C-shaped connecting member 40 (FIG. 1) which forms part of the supporting structure 3 and extends between end portions of the first straight portions 6a,7a. More specifically, the C-shaped connecting member 40 comprises a substantially straight central portion 42 integrally joined at its ends to C-shaped portions 43 from which straight appendices 45 extend parallel to one another and with a cross-section smaller than the cross-section of the curved portions 43. The straight appendices 45 are inserted into respective openings formed by end portions of the first straight tubular portions 6a,7a. In that respect each appendix 45 has a cross-section that is complementary to the cross-section of the tubular supporting member 6,7. The front edge 32 rests on the straight portion 42 and the curved portions 32c rest on the C-shaped curved portions 43.

According to the present invention, a second upperside 4s of the panel 4 is covered with at least a flexible cover sheet 46 comprising lateral end portions that extend beyond the lateral edges 30 of the panel 4 to define a portion folded under the panel 4. Said folded portion is pressed between a perimeter portion of the second face 4i of the panel and the wall 12b of the first straight portion 6a,7a.

The panel 4 and the cover sheet 46 are thus fixed securely to the supporting structure 3.

Also note that the connecting member 40 comprises a core (not illustrated) made of metal (in particular an aluminium casting—FIG. 1) covered with a layer of plastic material.

In its simplest form shown in FIG. 1 the contoured panel 5 is roughly rectangular, of constant thickness, and bounded (FIG. 1) by two straight lateral edges 50, by a substantially straight bottom edge 51, and by a top edge 52 joined to the lateral edges 50 by two curved portions 52c.

A pair of appendices 33 extend from a first rear face 5i (FIG. 4) of the contoured panel 5i; each appendix 33 has across-section that is complementary to that of the groove 15 inside which it is housed. For instance in the example that is illustrated each appendix 33 has an isosceles trapezoidal cross-section (also known as a "swallow-tail" cross-section) in which the shortest side portion is fixed securely to the rear face of the panel 5 and the longest side portion faces the bottom wall 15f of the groove 15.

The appendices 33 thus engage the grooves 15 of the second straight portion 6b,7b, the bottom edge 51 is housed in the groove 24 and the top edge 52 rests on a C-shaped connecting member 60 (FIG. 1) which forms part of the supporting structure 3 and extends between end portions of the second straight portions 6b,7b. More specifically, the C-shaped connecting member 60 comprises a substantially straight central portion 62 connected integrally at the ends to C-shaped curved portions 63, from which extend parallel straight appendices 65 smaller in cross-section than the curved portions. The straight appendices 65 are inserted inside respective openings defined by end portions of second straight tubular portions 6b,7b. In that respect, each appendix 65 has a cross-section that is complementary to that of the tubular supporting member 6,7. The front edge 62 rests on the top edge 52 and the curved portions 63 rest on the curved portions 52c.

According to the present invention, a second front face 5s of the panel 4 is covered with at least a flexible cover sheet 70 comprising lateral end portions that extend beyond the lateral edges 50 of the panel 5 to define a portion folded under the panel 5. Said folded portion is pressed between a perimeter portion of the second face 5i of the panel and the wall 12b of the second straight portion 6b,7b.

The contoured panel 5 and the cover sheet 70 are thus joined securely to the supporting structure 3. Note also that the connecting member 60, as described for the connecting member 40, comprises a core made of metal (in particular an aluminium casting—not illustrated) covered with a layer of plastic material.

Advantageously (FIG. 3) each appendix 33 of the panel 4 is associated with a rib 75 that extends integrally from the underside of the panel 4 and rests on an edge of the first straight portion 6a,7a thus improving the stability of the supporting structure 3.

Similarly each appendix 33 (FIG. 4) of the panel 5 is associated with a rib 75 that extends integrally from the rear face of the panel 5 and rests on an edge of the second straight portion 6b,7b thus improving the stability of the supporting structure 3.

The advantages of the present invention are clear in that the seat described above comprises a very small number of parts, has a robust structure, and is quick to make and efficient.

The seat 1 comprises only nine main parts, i.e. the lateral supporting members 6,7, the cross-member 8, the connecting members 40 and 60, the panels 4 and 5 and the cover sheets 46 and 70.

More specifically, the lateral supporting members 6,7 are first joined by the cross-member 8. The appendices 33 of the panel 4 supporting the cover sheet 46 are then inserted into the grooves 15 sliding the panel 4 until the rear edge 31 engages the groove 24. The connecting member 40 is then assembled by inserting the appendices 45 into the sections 6a,7a. The connecting member 40 is then fitted securely in place (for example by means of screws or rivets, which are not shown) to retain the panel 4 and join the lateral supporting members 6,7 together more securely.

Moreover, the appendices 33 of the panel 5 supporting the cover sheet 70 are inserted into the grooves 13b by sliding the panel 5 until the bottom edge 51 engages the groove 24. The connecting member 60 is then fitted by inserting the appendices 65 into the sections 6b,7b. The connecting member 60 is then fitted securely in place (for example by means of screws or rivets, which are not shown) to retain the panel 5 and join the lateral supporting members 6,7 together more securely.

The above operations are extremely simple, and can be performed quickly even by unskilled workers.

Either one of the panels 4,5 can be replaced—for example in the event of serious damage caused by vandals—by simply removing the relative connecting member 40,60, extracting the panel to be replaced by sliding the appendices 33 along the grooves 13, inserting a new panel and fixing the connecting member 40,60 back onto the lateral supporting members 6,7.

The seat according to the present invention can be used to advantage on a wide range of vehicles, for instance rubber-tired transport vehicles, such as city or intercity buses, etc., and "rail" vehicles, such as trains, trams, subway trains, etc.

For each specific application, the seat 1 is fitted securely to the vehicle, in particular to a supporting surface of the vehicle, using the appropriate conventional connecting means (not illustrated).

Such connecting means are normally fitted to the underside of the first straight portions 6a,7a.

Clearly, modifications and variations may be made to the vehicle seat as described and illustrated herein without departing from the scope of the present invention as defined by the claims.

The invention claimed is:

1. A vehicle seat comprising:
a supporting structure and a first and second contoured panel fitted to the supporting structure and respectively defining the seat portion and the backrest of the seat; the supporting structure comprises a first and a second lateral supporting member extending along opposite sides of the seat and joined to one another by a cross-member extending along a join between the seat portion and the backrest;
each lateral supporting member comprises a first straight portion and a second straight portion longer than the first straight portion and joined to said first portion by a curved connecting portion;
characterized in that each of the first and second straight portions has an elongated groove communicating with the outside through an elongated opening the width (w) of which is smaller than the maximum width (W) of the cross-section of the groove;
at least a pair of appendices extend from a first underside of the first contoured panel; each appendix has a cross-section that is complementary to that of said groove inside which it is housed so that the first panel is fixed securely to said supporting structure;
a second upper side of the first panel is covered with at least a flexible sheet cover comprising lateral end portions that extend beyond the lateral edges of the first panel to define a folded portion under the first panel;
said folded portion is stably and continuously pressed between a perimeter portion of the first underside of the first panel and a portion of the first straight portion;
at least a pair of appendices extend from a first rear face of the second contoured panel;
each appendix has a cross-section that is complementary to that of said groove inside which it is housed so that the second panel is fixed securely to said supporting structure;
a second front face of the second panel is covered with at least a flexible sheet cover comprising lateral end portions that extend beyond the lateral edges of the second panel to define a second folded portion under the panel;
said second folded portion is pressed between a perimeter portion of the first rear face of the second panel and a portion of the second straight portion.

2. The seat according to claim 1, wherein the appendices comprise elements that are integral with the first/second panel.

3. The seat according to claim 1, wherein said groove has a trapezoidal cross-section.

4. The seat according to claim 1, wherein said supporting structure comprises a first C-shaped connecting member comprising a substantially straight central portion and two curved end portions integral with the central portion and each coupled to a respective end portion of the first straight portion.

5. The seat according to claim 1, wherein said supporting structure comprises a second C-shaped connecting member comprising a substantially straight central portion and two curved end portions integral with the central portion and each coupled to a respective end portion of the second straight portion.

6. The seat according to claim 1, characterized in that the first and the second lateral support members each comprise a tubular section; said section comprising a first C-shaped side wall integrally joined to two substantially flat walls facing one another and sloping with respect to one another so as to merge with a second substantially C-shaped side wall.

7. A vehicle seat comprising:
a supporting structure and a first and second contoured panel fitted to the supporting structure and respectively defining the seat portion and the backrest of the seat; the supporting structure comprises a first and a second lateral supporting member extending along opposite sides of the seat and joined to one another by a cross-member extending along a join between the seat portion and the backrest;
each lateral supporting member comprises a first straight portion and a second straight portion longer than the first straight portion and joined to said first portion by a curved connecting portion;
wherein each of the first and second straight portions has an elongated groove communicating with the outside through an elongated opening the width (w) of which is smaller than the maximum width (W) of the cross-section of the groove;
at least a pair of appendices extend from a first underside of the first contoured panel; each appendix has a cross-section that is complementary to that of said groove inside which it is housed so that the first panel is fixed securely to said supporting structure;
a second upper side of the first panel is covered with at least a flexible sheet cover comprising lateral end portions that extend beyond the lateral edges of the first panel to define a folded portion under the first panel;
said folded portion is pressed between a perimeter portion of the first underside of the first panel and a portion of the first straight portion;
at least a pair of appendices extend from a first rear face of the second contoured panel;
each appendix has a cross-section that is complementary to that of said groove inside which it is housed so that the second panel is fixed securely to said supporting structure;
a second front face of the second panel is covered with at least a flexible sheet cover comprising lateral end portions that extend beyond the lateral edges of the second panel to define a second folded portion under the panel;
said second folded portion is pressed between a perimeter portion of the first rear face of the second panel and a portion of the second straight portion;
wherein the appendices comprise elements that are separate from the first/second panel and joined by connecting means to the first/second panel.

8. A vehicle seat comprising:
a supporting structure and a first and second contoured panel fitted to the supporting structure and respectively defining the seat portion and the backrest of the seat; the supporting structure comprises a first and a second lateral supporting member extending along opposite sides of the seat and joined to one another by a cross-member extending along a join between the seat portion and the backrest;
each lateral supporting member comprises a first straight portion and a second straight portion longer than the first straight portion and joined to said first portion by a curved connecting portion;
wherein each of the first and second straight portions has an elongated groove communicating with the outside through an elongated opening the width (w) of which is smaller than the maximum width (W) of the cross-section of the groove;

at least a pair of appendices extend from a first underside of the first contoured panel; each appendix has a cross-section that is complementary to that of said groove inside which it is housed so that the first panel is fixed securely to said supporting structure;

a second upper side of the first panel is covered with at least a flexible sheet cover comprising lateral end portions that extend beyond the lateral edges of the first panel to define a folded portion under the first panel;

said folded portion is pressed between a perimeter portion of the first underside of the first panel and a portion of the first straight portion;

at least a pair of appendices extend from a first rear face of the second contoured panel;

each appendix has a cross-section that is complementary to that of said groove inside which it is housed so that the second panel is fixed securely to said supporting structure;

a second front face of the second panel is covered with at least a flexible sheet cover comprising lateral end portions that extend beyond the lateral edges of the second panel to define a second folded portion under the panel;

said second folded portion is pressed between a perimeter portion of the first rear face of the second panel and a portion of the second straight portion;

wherein each appendix of the first panel is associated with a rib which extends integrally from the bottom face of the first panel and rests on an edge of the first straight portion; each appendix of the second panel is associated with a rib which extends integrally from the rear face of the second panel and rests on an edge of the second straight portion.

* * * * *

UNITED STATES PATENT AND TRADEMARK OFFICE
CERTIFICATE OF CORRECTION

PATENT NO.        : 8,727,445 B2
APPLICATION NO.   : 13/052751
DATED             : May 20, 2014
INVENTOR(S)       : Cosimo De Maina It is certified that error appears in the above-identified patent and that said Letters Patent is hereby corrected as shown below:

On the title page, Item (73), Assignee, "Petra Italia S.A.S. de Marina Bordo & C." should be changed to --Ruspa Officine S.p.A.--

Signed and Sealed this
Sixteenth Day of December, 2014

Michelle K. Lee
*Deputy Director of the United States Patent and Trademark Office*